United States Patent
Leddy

(10) Patent No.: US 11,068,576 B2
(45) Date of Patent: Jul. 20, 2021

(54) HARDENING SECURITY IMAGES

(71) Applicant: PAYPAL, INC., San Jose, CA (US)

(72) Inventor: William Joseph Leddy, Georgetown, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/793,764

(22) Filed: Feb. 18, 2020

(65) Prior Publication Data

US 2020/0293645 A1 Sep. 17, 2020

Related U.S. Application Data

(63) Continuation of application No. 15/785,391, filed on Oct. 16, 2017, now Pat. No. 10,565,361, which is a continuation of application No. 14/825,221, filed on Aug. 13, 2015, now Pat. No. 9,792,423, which is a continuation of application No. 13/429,108, filed on Mar. 23, 2012, now Pat. No. 9,129,102.

(51) Int. Cl.
*G06F 21/36* (2013.01)
*G06K 9/68* (2006.01)
*G06K 9/62* (2006.01)

(52) U.S. Cl.
CPC ........... *G06F 21/36* (2013.01); *G06K 9/6206* (2013.01); *G06K 9/68* (2013.01)

(58) Field of Classification Search
CPC ......... G06F 21/36; G06K 9/68; G06K 9/6206
See application file for complete search history.

(56) References Cited

U.S. PATENT DOCUMENTS

| | | | |
|---|---|---|---|
| 4,982,430 A | 1/1991 | Frezza et al. | |
| 5,559,961 A | 9/1996 | Blonder | |
| 6,871,278 B1 * | 3/2005 | Sciupac | ............... H04L 63/126 713/185 |
| 7,266,693 B1 | 9/2007 | Potter et al. | |
| 8,132,255 B2 | 3/2012 | Mates | |
| 8,370,926 B1 | 2/2013 | Satish | |
| 8,448,226 B2 | 5/2013 | Narasimhan | |
| 8,489,883 B2 | 7/2013 | Dellinger et al. | |
| 8,850,519 B2 | 9/2014 | Osborn et al. | |
| 8,931,083 B2 | 1/2015 | Griffin et al. | |
| 9,129,102 B2 | 9/2015 | Leddy | |
| 9,792,423 B2 | 10/2017 | Leddy | |
| 10,565,361 B2 | 2/2020 | Leddy | |
| 2006/0206918 A1 | 9/2006 | McLean | |
| 2007/0277224 A1 | 11/2007 | Osborn et al. | |
| 2010/0043062 A1 | 2/2010 | Alexander et al. | |
| 2010/0095350 A1 * | 4/2010 | Lazar | ..................... G06F 21/36 726/3 |

(Continued)

*Primary Examiner* — Wesley J Tucker
(74) *Attorney, Agent, or Firm* — Haynes and Boone, LLP

(57) ABSTRACT

Methods and systems are provided for electronic authentication. A modified electronic image is generated by altering at least a pixel of an electronic image. The electronic image is an image that has been previously viewed by a user during a setup process. In response to receiving an authentication request from the user, the modified electronic image is displayed to the user via an electronic display along with one or more other electronic images. A determination is made as to whether the user is able to recognize the modified electronic image. In response to determination that the user is able to recognize the modified electronic image, the authenticating request is granted.

20 Claims, 5 Drawing Sheets

(56) References Cited

U.S. PATENT DOCUMENTS

| | | |
|---|---|---|
| 2010/0169958 A1 | 7/2010 | Werner et al. |
| 2010/0180336 A1 | 7/2010 | Jones et al. |
| 2011/0016520 A1 | 1/2011 | Cohen et al. |
| 2011/0145587 A1 | 6/2011 | Park |
| 2012/0323700 A1* | 12/2012 | Aleksandrovich ..... G06Q 30/00 705/14.69 |
| 2013/0042311 A1* | 2/2013 | Broder ................. H04L 9/3271 726/7 |
| 2013/0047144 A1 | 2/2013 | Chalmers et al. |
| 2013/0145441 A1* | 6/2013 | Mujumdar ............ G06F 21/305 726/5 |
| 2013/0251212 A1 | 9/2013 | Leddy |
| 2014/0115340 A1* | 4/2014 | Lee ..................... H04L 9/3271 713/182 |
| 2015/0012988 A1* | 1/2015 | Jeng ..................... G06F 21/36 726/7 |
| 2015/0347869 A1 | 12/2015 | Leddy |
| 2016/0050198 A1* | 2/2016 | Thibadeau, Sr. ... H04L 63/0807 726/6 |
| 2017/0170967 A1* | 6/2017 | Luo ......................... G09C 5/00 |
| 2018/0101674 A1 | 4/2018 | Leddy |

* cited by examiner

HARDENING SECURITY IMAGES

CROSS REFERENCE TO RELATED APPLICATIONS

The present application is a continuation application of U.S. patent application Ser. No. 15/785,391, filed Oct. 16, 2017, issued as U.S. Pat. No. 10,565,361, which is a continuation of U.S. patent application Ser. No. 14/825,221, filed Aug. 13, 2015, issued as U.S. Pat. No. 9,792,423, which is a continuation application of U.S. patent application Ser. No. 13/429,108, filed on Mar. 23, 2012, issued as U.S. Pat. No. 9,129,102, the disclosures of which are hereby incorporated by reference in their entirety.

BACKGROUND

Technical Field

The present disclosure generally relates to electronic authentication and, more particularly, relates to the hardening of images that are used for electronic authentication such that the images are more resistant to malware.

Related Art

Various computer systems require that a user answer one or more questions in order authorize access of the user to a website or to other features or services offered by the computer system. By requiring the correct response to such questions, the computer system can determine that a human being, rather than a machine, is most likely requesting the access. The computer system can also determine that the user is an authorized user, e.g., the computer can determine an identity of the user. It can be desirable to limit access to human beings because computers are routinely used to mine databases for information that is not intended to be disbursed in mass. It can be desirable to limit access to authorized users, such as when access to the website or service is offered on a subscription basis and only users who have paid for the subscription are authorized to have access.

One problem with such authentication questions is that their use has been found to be objectionable to many users. Many users find the question and answer process too cumbersome and time consuming. Also, answering questions is subject to entry errors that can cause a user to have to re-type a response. Images, rather than questions, can be used for authentication and can mitigate such problems.

However, both question and image base authentication systems are undesirably susceptible to malware. Malware installed upon a user's computer can too easily recognize and provide the correct answers or images, thus undesirably allowing a machine to have unauthorized access to the computer system.

SUMMARY

According to one or more embodiments, methods and systems are provided for mitigating the undesirable susceptibility of images used in an authentication process to malware. The images can be hardened or made less susceptible to malware by modifying the images. For example, an image can be modified such that a checksum for the image is changed. In this manner, the modified image can be recognized or characterized much more readily by a human being than by a computer.

According to one or more embodiments, a system can comprise a memory for storing a plurality of images and for storing account information for a plurality of users. The account information can include personal image information for at least some of the users. A processor can receive a communication including an indication of a desire of a user to be authenticated. The processor can access an account of the user, modify the plurality of images to form a modified plurality of images, provide the modified plurality of images to the user, receive trial personal image information, e.g., image selections, from the user, compare the personal image information stored in the memory to the trial personal image information received from the user, and authenticate the user if the personal image information stored in the memory is the same as the trial personal image information.

Modifying the plurality of images can comprise making a change to at least one of the plurality of images that will change a checksum of at least one of the images. Modifying the plurality of images can comprise making a subtle change to at least one of the plurality of images or making an obvious change to at least one of the images. Modifying the plurality of images can comprise making a change to a plurality of portions of the image(s). Modifying the plurality of images can comprise substituting a different image for at least one of the images. The substituted different image(s) can be image(s) of the same type of object.

Thus, images can be used for authentication in a manner that is substantially less susceptible to malware. Modifying the images can prevent the malware from recognizing the images during the authentication process.

DETAILED DESCRIPTION

Figure 1:
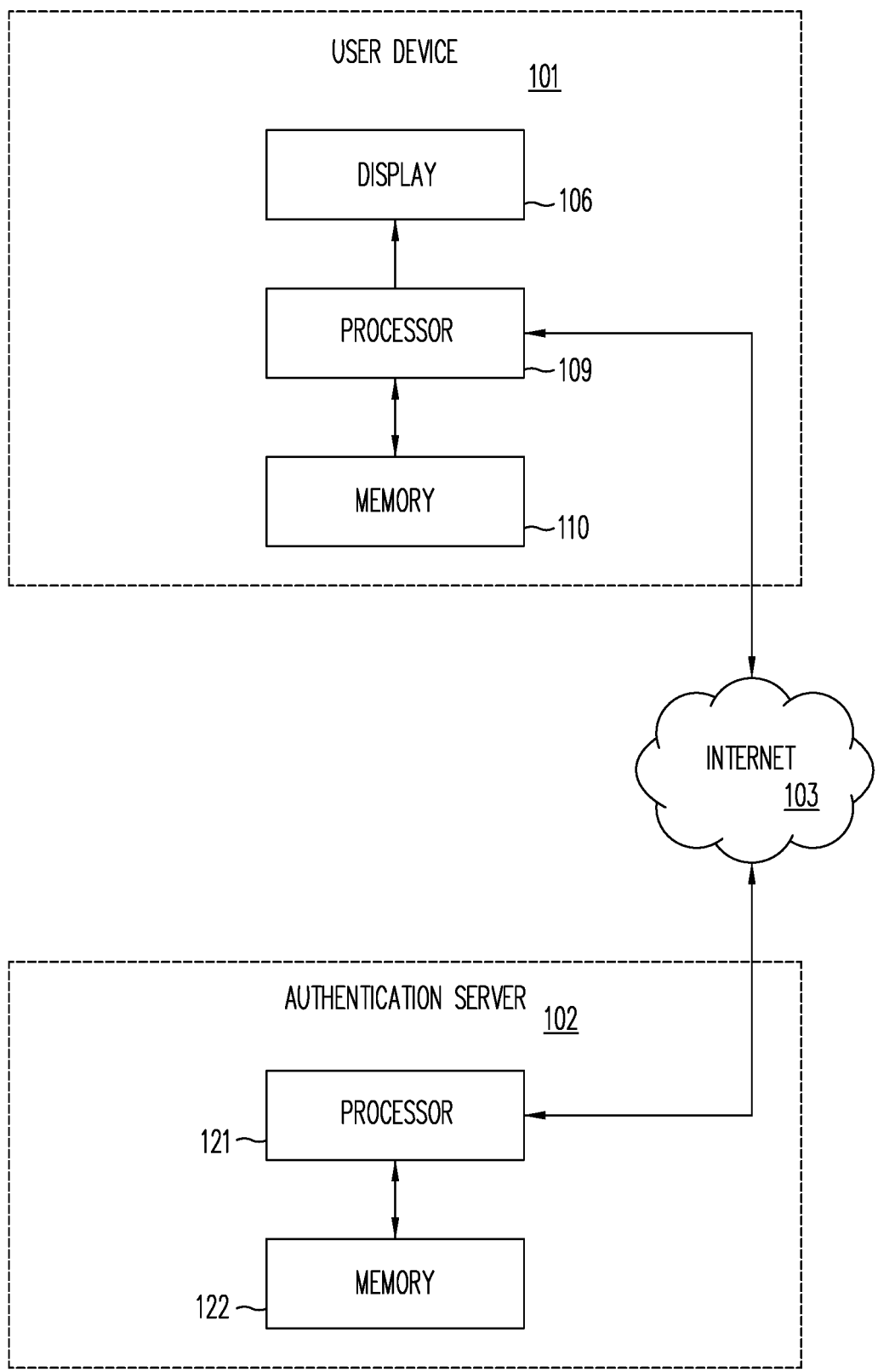
FIG. 1 is a block diagram showing a system for hardening security images used for authentication such that the images are resistant to malware, in accordance with one or more embodiments.

Images can be used instead of questions to facilitate authorization for such activities as entering a web sited, using a computer service, completing a purchase, retrieving a forgotten password, or performing a financial transaction. Such authorization can help to assure that a human being, rather than a machine, is requesting the access or service. Many users prefer image identification or characterization to the contemporary process of answering questions. This is particularly true for touch screen devices that lack a keyboard.

The use of images, rather than questions, for authentication can be more user friendly and less subject to error, such as mistyping a response.

A user may be presented with a plurality of images by an authentication server. The user can then be prompted to identify or characterize the images. The user can be asked to select images that match a description. For example, the user can be shown multiple images and then asked to select a tree from among the images.

The user can be asked to select images that the user has previously selected or characterized. For example, during a setup process, the user can be requested to identify which images the user likes or which images the user dislikes. The user's response, e.g., the selected images, can be stored by the authentication server. The user can later be presented with at least some of these images and then asked to identify which of the images the user likes and/or which of the images the user dislikes to facilitate authentication.

However, if malicious software, e.g., malware, is present on the user's system, then the malware can capture the images and user's responses when the user performs an authentication process. The malware can also capture any associated image information such as filenames or descriptions associated with the images. The malware can then use the captured images, responses, and associated information to mimic the user during a subsequent authentication process. In this manner, the malware can gain illegitimate access to computers systems or services.

The malware can capture the entire images. Alternatively, the malware can create a checksum of each image (or a portion of each image) to uniquely identify the image. There are a variety of ways to create a checksum, but a simple example is to sum of all the bytes in the image. The malware can record the checksums and responses locally.

The malware can recognize an image by forming a checksum of the image when the image is presented in an authorization process and then comparing that checksum to the checksums of images provided in subsequent authorization processes. Because the checksums are normally large numbers, there is a very high probability that the checksums of different images will be different. The checksums of identical images will always be the same. Thus, when the checksums of two images are the same, it can generally be assumed that the images are the same.

Thus, the malware can pretend to be the legitimate user by recognizing and selecting the same images that were previously selected by the legitimate user. The malware can recognize images by matching the image filename, image description, complete image file contents (the image itself), or the checksum for the image against a previously recorded image selection.

The malware can report the checksums or other image identifying information and the user's responses to a remote computer. In this manner, the malware can recognize the images used in the authorization process and can gain illegitimate access to computers systems or services via the user's computer or via another, e.g., the remotely located, computer.

According to one or more embodiments, methods and systems are provided for mitigating the undesirable susceptibility of images used in an authentication process to malware. The images can be hardened or made less susceptible to malware by modifying the images. For example, an image can be modified such that a checksum for the image is changed. The images can be modified prior to each use. Modified images can be recognized or characterized much more readily by a human being than by a computer. Thus, the use of malware to gain illegitimate access to computer systems and services can be substantially mitigated.

It is worthwhile to note that images can be substantially modified so that it is very difficult, if not impossible given today's technology, for a computer to recognize the images. However, even with such extensive modification, a human can still readily recognize the images.

FIG. 1 is a block diagram showing a system for hardening security images used for authentication such that the images are resistant to malware, in accordance with one or more embodiments. The system can comprise a user device 101 and an authentication server 102.

The user device 101 can be a merchant terminal, an automatic teller machine (ATM), a computer, a game console, a cellular telephone, or the like. The user device 101 can comprise a display 106, a processor 109, and a memory 110. The images used for authentication can be shown upon the display 106, for example.

The authentication server 102 can be a payment server, an online merchant website server, or any other type of computer, server, or network thereof. The authentication server 102 can comprise a processor 121 and a memory 122.

The processor 121 and the memory 122 of the authentication server 102 can cooperate to inhibit malware from recognizing images and then attempting to mimic a user's responses to the images to gain illegitimate access to computer systems and services that are intended for human access. In this manner, such illegitimate access can be substantially thwarted.

The memory 122 can store a plurality of images for use in authenticating the user, as discussed herein. The memory 122 can store a large pool of images for use with all users. The memory 122 can store a larger plurality of images than is typically used for a single authentication of a user such that the same images are not provided to a given user for every authentication of that user. The memory 122 can store account information for a plurality of users. The account information can include personal image information for at least some of the users. For example, the personal image information can be indicative of the user's identification of the images and/or the user's characterization of the images. Thus, the memory 122 can store the user's previous responses to questions regarding the images. This information can be used in subsequent authentication processes.

The user's characterization of an image can include a name that the user associates with the image. The user's characterization of an image can include a feeling or emotion associated by the user with the image. For example, the characterization can regard the users like or dislike of each of the images.

Figure 2:
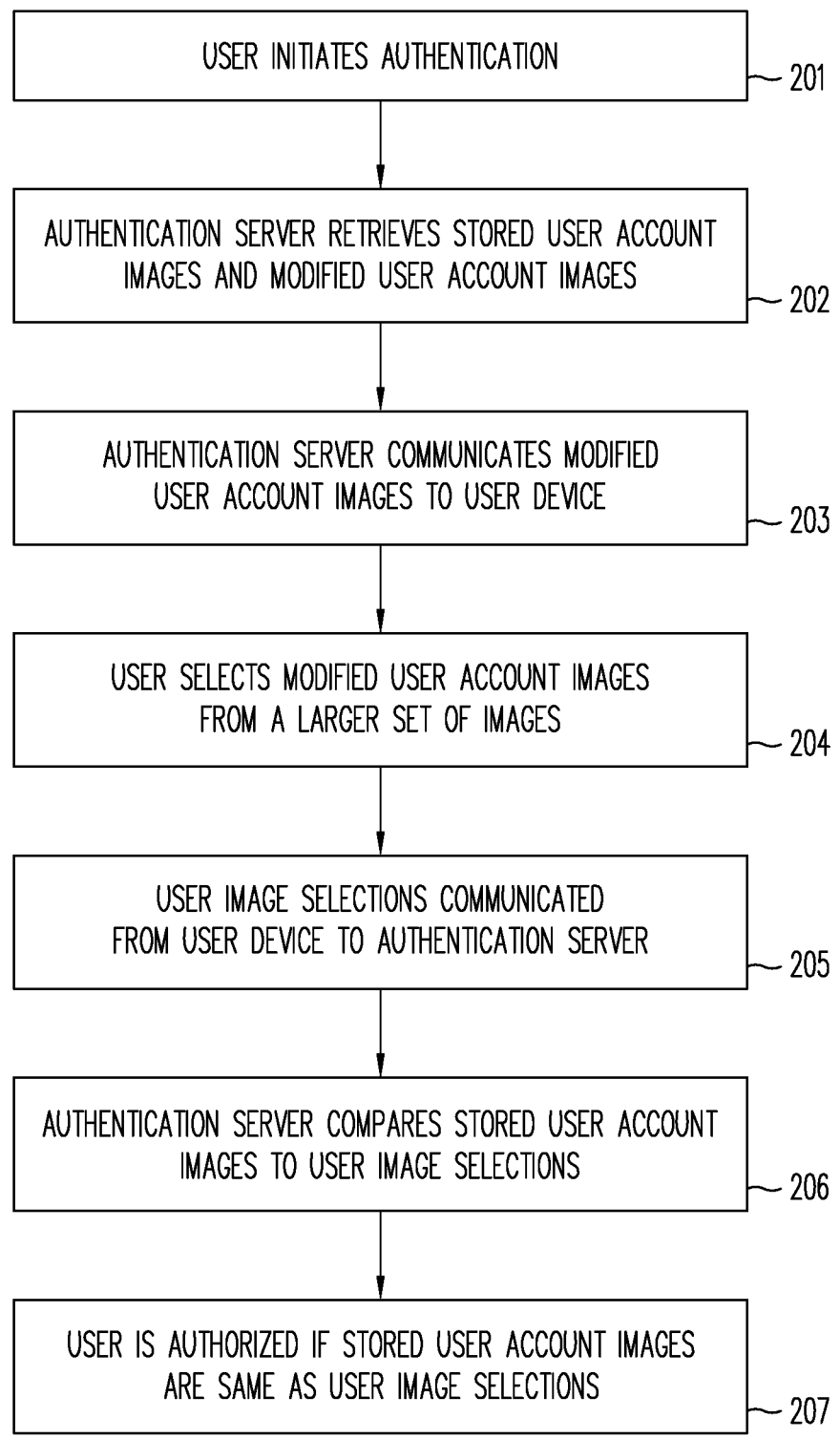
FIG. 2 is a flow chart showing a method for hardening security images used for authentication such that the images are resistant to malware, in accordance with one or more embodiments.

FIG. 2 is a flow chart showing a method for hardening security images used for authentication such that the images are resistant to malware, in accordance with one or more embodiments. The user can initiate authentication, as shown in step 201. The user can initiate authentication by beginning a log on or authentication process with the user device 101. For example, the user can begin to log on to a merchant web site with the user device 101. As a result of the user initiating authentication, the processor 121 of the authentication server 102 can receive a communication including an indication of a desire of the user to be authenticated. The processor 121 can access an account of the user to determine which images stored in the memory 122 are to be sent to the user during the authentication process. Generally, images previously provided to the user and identified or characterized by the user will be sent to the user during the authentication process.

The authentication server 102 can retrieve user account images for the user from the user's account and can modify the user account images for use in the authentication process, as shown in step 202. The images can be modified using the processor 121 to form a modified plurality of images. Modifying an image can comprise making a change to the images that will change a checksum of the images. Modifying an image can comprise making either a subtle change to the image or making an obvious change to the image. A subtle change can be a change that is substantially undetectable to many people. That is, subtle change can be some slight change that a person observing the image is not likely to notice. For example, a subtle change can be a change to only one pixel or a very small change to many pixels.

An obvious change can be a change that is readily noticed by many people. The obvious change can be a change that does not substantially vary the fundamental character of the image. For example, the obvious change can be a change from a maple tree to an oak tree. Such a change can readily be noticed by many people. However, the fundamental character of the image remains the same. Both the maple tree and the oak tree are trees.

A change can be made to a plurality of portions of the image. For example, the image can be divided into a plurality of sections and a change can be made to each section of the image, as discuss further below. Modifying an image can comprise changing at least one pixel of the image. For example, the color or other information of the pixel can be changed. Any of the information that defines the pixel can be changed. Any number of pixels can be changed. Modifying an image can comprise changing a color of a portion of the image or of the entire image. A color pallet of the image can be changed. For example, color palette depth can be changed from a large number of colors, e.g., 64,000 colors to a smaller number of colors, e.g., 8 colors. The color pallet of the image can be inverted. A color image can be changed to a gray scale image. A gray scale image can be changed to a color image.

The image can be changed to an outline, shadow, profile, or silhouette. For example, a photograph of a tree can be changed into a silhouette of the tree. The image can be modified by moving the image. For example, the image can be translated the image or rotated. To translate the image, the image can be shifted horizontally, vertically, or a combination of horizontally and vertically by a few pixels. The image can be rotated about its center, one of its corners, or any other point either in the image or outside of the image.

The image can be modified by pixelating the image. Any number of pixels can be combined in the pixelation process. For example, the pixelations can contain two, three, four, five, six, or more pixels. The pixilation can be either subtle or obvious. The image can be modified by changing a resolution of the image. The change in resolution can be to a higher resolution or to a lower resolution. The change in resolution can be either subtle or obvious. The image can be modified by cropping the image. The image can be cropped in any manner. The image can be cropped only horizontally or only vertically. The image can be cropped both horizontally and vertically. The image can be cropped by a single line of pixels. The cropping can be either subtle or obvious.

The image can be modified by changing an object, such as a background object, of the image. For example, a background color of the image can be changed. An item in the background of the image can be removed, added, or changed. The image can be modified by mirroring the image. For example, the image can be flipped about a vertical centerline. The image can be flipped about any other line, whether horizontal, vertical, or sloped. The image can be modified by adding a border to the image. The border can be plane or fancy. The border can contain a pattern. The image can be modified by removing an existing border from the image. The image can be modified by changing an existing border of the image.

The image can be modified by adding an object to the image. For example, a tree can be added to an image of trees. The image can be modified by removing an object from the image. For example, one tree can be removed from an image showing a plurality of trees. The image can be modified by changing an object in the image. For example one type of tree can be change to another type of tree.

The image can be modified by warping the image. For example, the image can be stretched or bent, either vertically, horizontally, or both. Only a portion of the image can be warped. The warping can be either subtle or obvious. The image can be modified by changing a size of the image. The image can be changed to be either larger or smaller. The image can be modified by changing an aspect ratio of the image.

The size of an item in the image can be changed. For example, a tree in the image can be made smaller. Objects within the image can change with respect to a z-axis (an axis that is perpendicular to the plane of the image). For example, a flock of birds could fly behind a tree instead of in front of the tree. The image can be rotated or tilted slightly. For example, the plane of the image could be tilted to provide the effect of viewing a rhombus shaped image instead of a square image.

A combination of such changes can be made to an image to better thwart malware's ability to recognize the images. Indeed, the entire image can be changed to another, generally similar image or type of image. Thus, an image of one tree can be changed to an image of a different tree. The different tree can be in a different setting, i.e., can have an altogether different background.

All of the images used for the authentication of a particular user can be modified. Alternatively, only some of the images used for the authentication of a particular user can be modified. Generally, at least one of the images is modified.

Generally, any change or combination of changes that results in a different checksum can be performed by the processor 121. The processor 121 can verify that the checksum of the modified image is different with respect to the checksum of the unmodified image. If the checksum of the modified image is not different with respect to the checksum of the unmodified image, then the image can be re-modified. The process of modifying the image, verifying that the checksum is different, and re-modifying the image can be repeated as necessary to obtain a modified image with a different checksum.

The order of the images can be randomized each time the images are presented to the user. Thus, the user can see the images in a different time order and/or at a different position on the display 106 for each authentication process. Such order randomization can help prevent malware from simply selecting images based on the image order or position.

The filenames for the images can be randomly created each time the images are presented to the user. This will prevent the malware from simply capturing the image name to identify the images. Image descriptions can be omitted to prevent their use by malware.

The authentication server 102 can communicate the modified user account images to the user device 101, as shown in step 203. Thus, the user can be presented with the modified images, such as by viewing the modified images on display 106. Any number of modified images can be communicated to the user device 101. Not all of the images have to be modified. Any number of unmodified images can be communicated to the user device 101.

The user can select images, identify images, or characterize images that are shown on the display 106 of the user device 101. The user can select images stored specifically for the user's account and then modified, e.g., the modified user account images, from a larger set of images that are presented to the user as shown in step 204. Images of the larger set can be stored locally, e.g., on the user device 101, or can be communicated from the authentication server 102 along with the modified user account images. For example, the user can select only images that were previous presented to the user, such as during a setup process. As a further example, the user can select only images that the user has previously selected, such as during the setup process. The selected images can define trial personal image information.

As a further example, the user can indicate whether the user likes or dislikes each of the images and this information can define trial personal image information. The user image selections or trial personal image information can be communicated from the user device 101 to the authentication server 102, as shown in step 205.

The authentication server 102 can compare stored user account images or personal image information to the user image selections or trial personal image information, as shown in step 206. The stored personal image information can be stored in and retrieved from the memory 122 of the authentication server 102. The stored personal image information can be information that was obtained from the user at an earlier time and stored for later use. For example, the user can have been presented with images and asked to indicate which images the user likes and dislikes during an earlier setup process. Alternatively, the user can have been presented with images and asked to indicate which images the user likes and dislikes during an initial authentication process. Questions, rather than images, can be used for authentication during such an initial authentication process. Any desired number of images can be presented and characterized during this setup process. A different subset of these images can be used later for each authentication process.

The user can be authorized to proceed if the stored user account images or personal image information is the same as the user image selections trial personal image information, as shown in step 207. The stored personal image information will be the same as the trial personal image information if the user has indicated that the same images are liked and disliked as in the earlier setup or authentication process. If the stored personal image information is not the same as the trial personal image information, then different images or the same images can be sent from the authentication server 102 to the user device 101 and the process can be repeated.

The use of a user's likes and/or dislikes of images herein is by way of example only and not by way of limitation. Rather than the user's likes and dislikes, the images can be selected based upon any criteria. For example, only images previous presently to the user can be selected or only images previously selected by the user can be again selected in order to obtain authorization.

Figure 3:
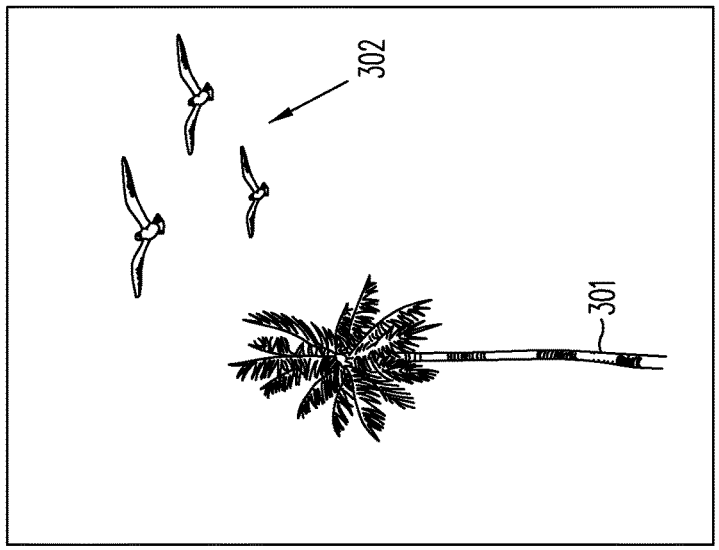
FIG. 3 is an example of an unmodified image that can be used for authentication in accordance with one or more embodiments.

FIG. 3 is an example of an unmodified image that can be used for authentication in accordance with one or more embodiments. This example of an unmodified image includes a tree 301 and three birds 302. The unmodified image can be used in the setup process or in an initial authentication process. The image can be modified for subsequent use of the image.

FIGS. 4-11 show how an image can be modified by making various different changes to the image. These are examples of changes that can be made to an image. Many other, different, changes and/or combinations of changes can likewise be used.

Figure 4:
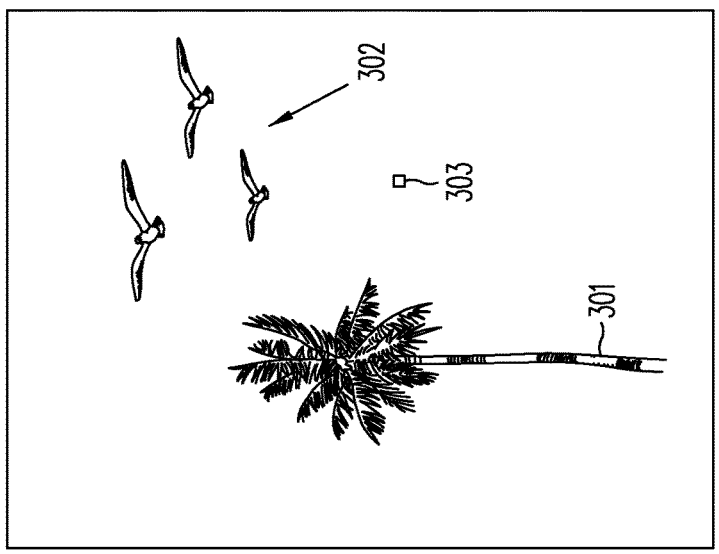
FIG. 4 is an example of a modified image, wherein a single pixel of the image has been changed, in accordance with one or more embodiments.

FIG. 4 is an example of a modified image, wherein a single pixel 303 of the image has been changed, in accordance with one or more embodiments. The single pixel 303 can be any pixel of the image. The single pixel 303 can be changed in any manner that results in a different checksum for the image. Typically, any change to a pixel will result in a different checksum for the image. Any bit, byte, or word of an image file can be changed to provide the modified image. When changes to an image are discussed here, such changes can be made to the image file.

Figure 5:
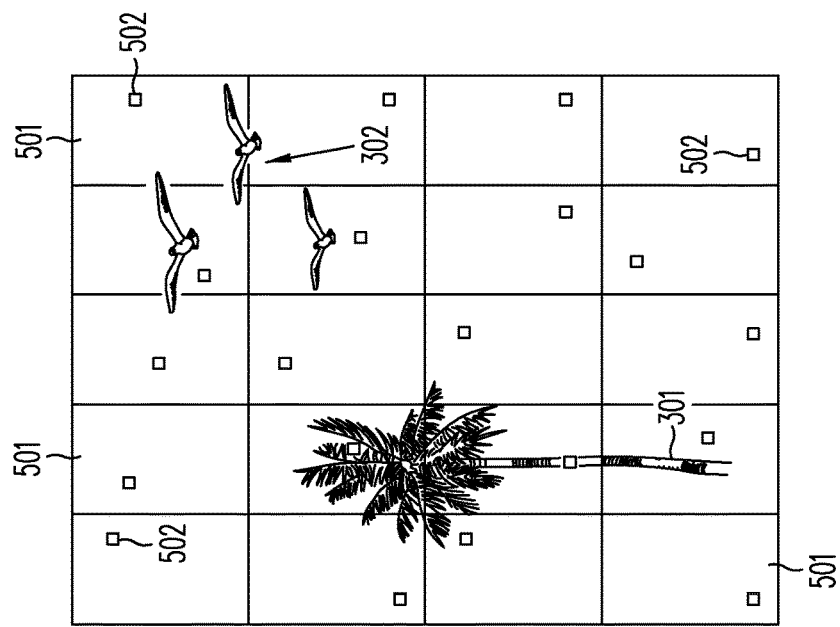
FIG. 5 is an example of a modified image, wherein the image has been divided into a plurality of portions and at least one pixel of the image has been changed in each portion, in accordance with one or more embodiments.

FIG. 5 is an example of a modified image, wherein the image has been divided into a plurality of portions 501 and at least one pixel 501 of the image has been changed in each portion 501, in accordance with one or more embodiments. The image can be divided into any number of portions 501. Each portion 501 can be of any size. The image can contain portions 501 of different sizes. Any number of pixels can be changed in each portion 501. The portions 501 can be square, rectangular, or have any other shape. The portions 501 can have regular shapes or irregular shapes. For example, the image can be divided into a plurality of portions 501 similar to the manner in which a jigsaw puzzle is cut, e.g. using irregular lines.

Malware can identify an image by identifying only a portion of the image. By modifying plural portions of the image (such as portions 501 of the image), the ability of malware to identify an image by identifying only a portion of the image can be substantially mitigated.

Figure 6:
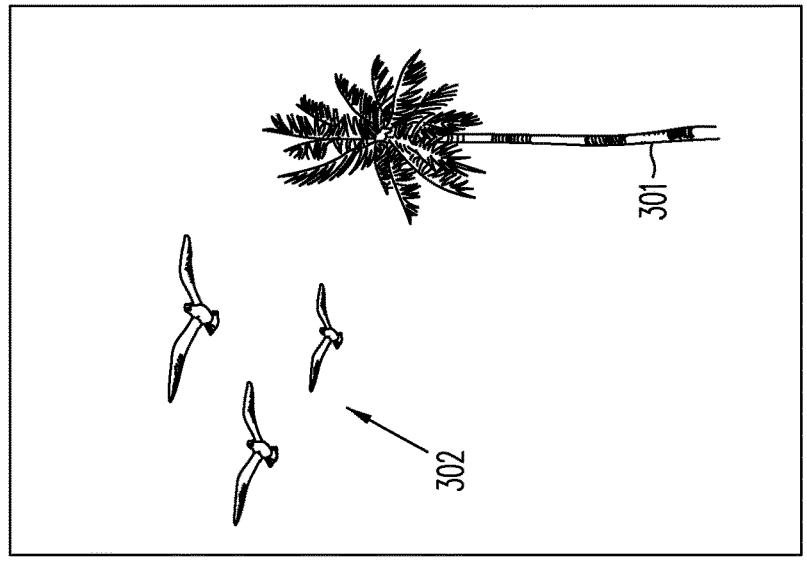
FIG. 6 is an example of a modified image, wherein the image has been mirrored, in accordance with one or more embodiments.

FIG. 6 is an example of a modified image, wherein the image has been mirrored, in accordance with one or more embodiments. The image has been mirrored by flipping the image about its vertical centerline.

Figure 7:
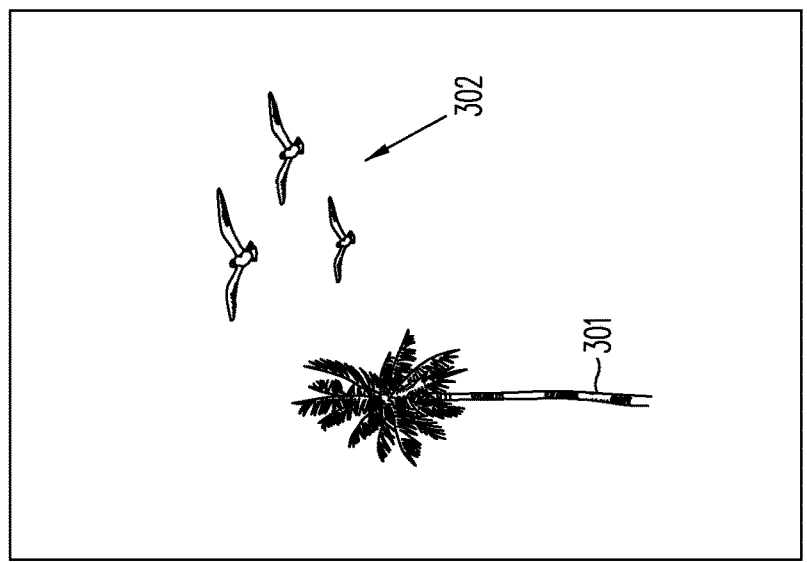
FIG. 7 is a is an example of a modified image, wherein the image has been made smaller, in accordance with one or more embodiments.

FIG. 7 is an example of a modified image, wherein the image has been made smaller, in accordance with one or more embodiments. The image can be made only slightly smaller, such that the difference is subtle. The image can be made substantially smaller, such that the difference in obvious.

Figure 8:
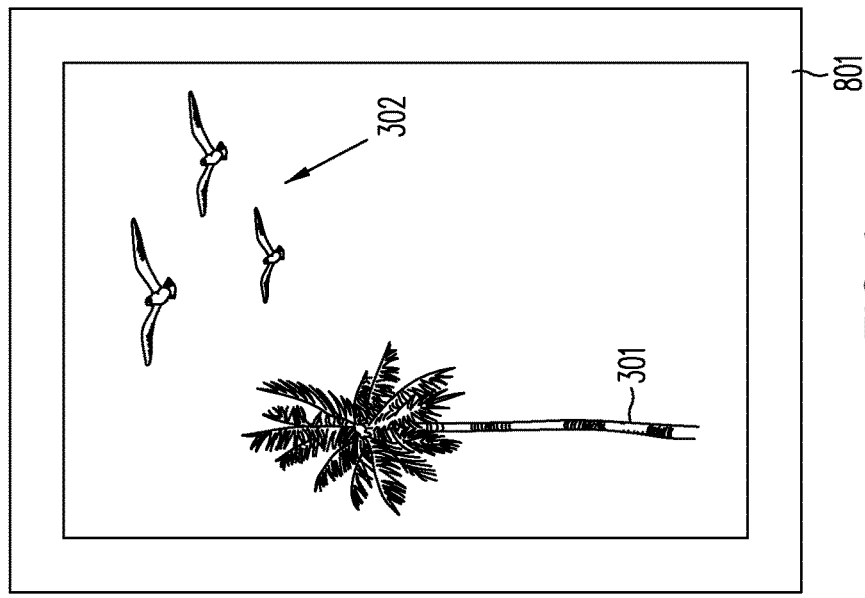
FIG. 8 is a is an example of a modified image, wherein a border has been placed around the image, in accordance with one or more embodiments.

FIG. 8 is an example of a modified image, wherein a border 801 has been placed around the image, in accordance with one or more embodiments. The border can have any desired width, shaped, or ornamentation.

Figure 9:
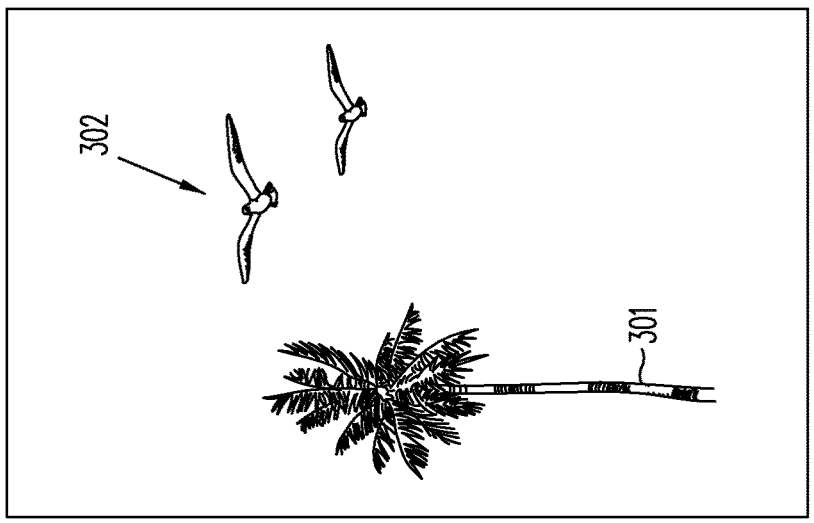
FIG. 9 is an example of a modified image, wherein a small change has been made to the image, in accordance with one or more embodiments.

FIG. 9 is an example of a modified image, wherein a small change has been made to the image, in accordance with one or more embodiments. One of the birds 302 has been omitted. Such a small change can be subtle.

Figure 10:
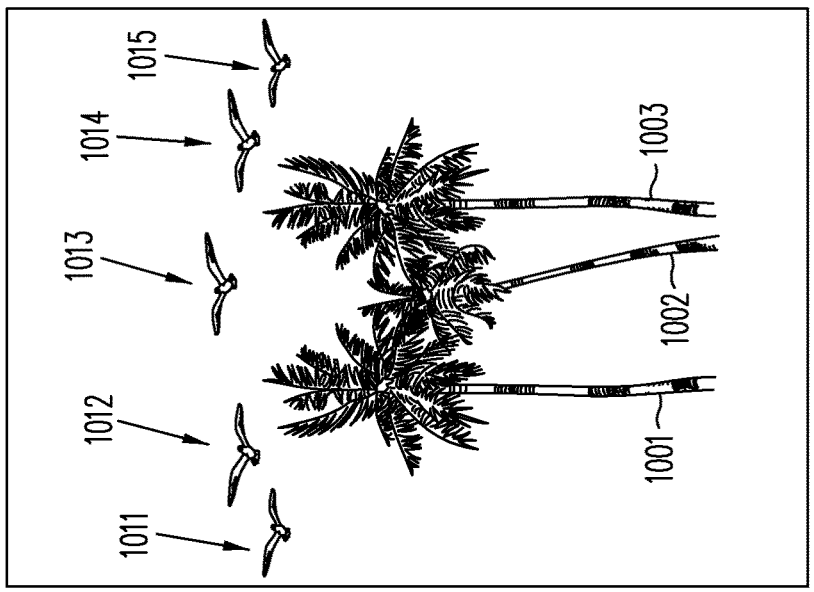
FIG. 10 is an example of a modified image, wherein a large change has been made to the image, in accordance with one or more embodiments.

FIG. 10 is an example of a modified image, wherein a large change has been made to the image, in accordance with one or more embodiments. A plurality of trees 1001-1003 have been substituted for the single tree 301 of FIG. 1 and a larger plurality of birds 1011-1015 have been substituted for the three birds of FIG. 1. The large change can be obvious.

Figure 11:
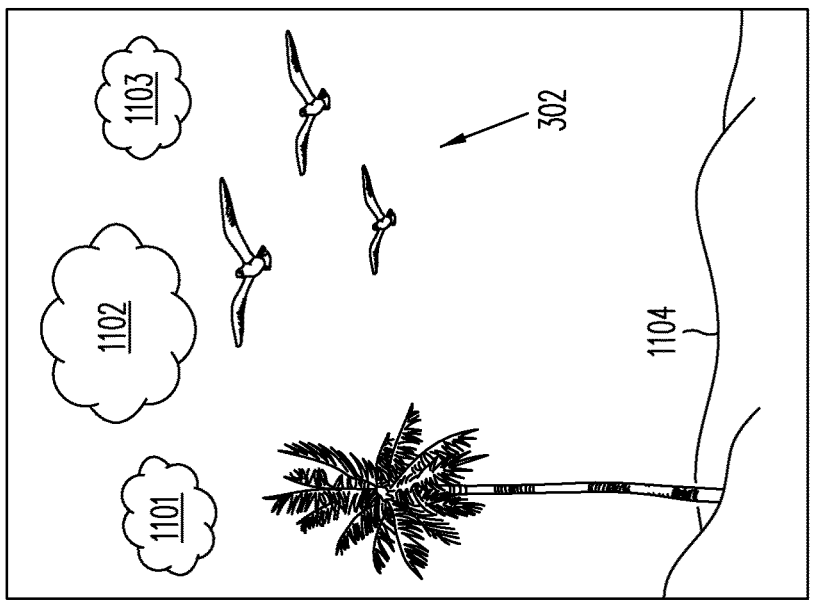
FIG. 11 is an example of a modified image wherein a background of the image has been changed, in accordance with one or more embodiments.

FIG. 11 is an example of a modified image wherein a background of the image has been changed, in accordance with one or more embodiments. A horizon 1104 and a plurality of clouds 1101-1103 have been added to the background. The added items can be either subtle or obvious.

The images can be modified every time the images are provided to the users. All of the images can be modified every time the images are provided to the user. Some of the images, but not all of the images, can be modified every time the images are provided to the user. A random number of the images can be modified every time that the images are provided to the user. The images to be modified can be selected randomly.

As used herein, the term "authentication" can be defined to include determining an identification of a person. Further, as used herein, the term "authentication" can be defined to include determining a human being is being communicated with. In either instance, the communication can be for such purposes as making a purchase (either online or in a brick and mortar store), accessing an account (such as a bank, payment service, or credit card account), retrieving a forgotten password, or accessing a web site.

As used herein, the term "subtle" can be defined to indicate changes to an image that cannot be visually detected by a human being.

As used herein, the term "obvious" can be defined to indicate changes to an image that can be visually detected by a human being.

As used herein, the term "checksum" can include a parity, a hash, a hash sum, a cyclic redundancy check (CRC), a fingerprint, or any other item, e.g., formula or algorithm, suitable for identifying, although not necessarily uniquely, an image.

As used herein, the term "recognize" can be used to indicate that a user appreciates that one image has something in common with another image. For example, an unmodified image of a tree and a modified image of a tree (which can be either the same tree or a different tree) can both be recognized as being trees.

As used herein, the term "characterize" can be used to indicate that a user appreciates some attribute or characteristic of an image. The attribute or characteristic can be either objective or subjective. For example, the user can indicate a color of an object of the image as a subjective characteristic of the image. For example, the user can indicate a like or a dislike of the image as a subjective characteristic of the image. The terms "recognize" and "characterize" can be used synonymously herein.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable and executable medium, which may refer to any medium that participates in providing instructions to the processor for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system for performing electronic authentication, the system comprising:
    a non-transitory memory; and
    one or more hardware processors coupled to the non-transitory memory and configured to read instructions from the non-transitory memory to cause the system to perform operations comprising:
        receiving an authentication request from a user device;
        retrieving an original image associated with an account of the user device;
        electronically modifying the original image such that a first checksum of the original image is different from a second checksum of the electronically modified image; and
        communicating the electronically modified image to the user device as part of a set of images in an authentication process,
        wherein an authentication is determined based on a response to the set of images including the electronically modified image received from the user device.

2. The system of claim 1, wherein the electronically modified image is a current electronically modified image, and wherein the current electronically modified image is different from a previous electronically modified image resulting from a previous authentication request from the user device.

3. The system of claim 1, wherein
    the response from the user device comprises a selection of an image from the set of images as being associated with the image that is retrieved, and wherein the user device is authenticated when the image selected corresponds to the original image that is retrieved.

4. The system of claim 1, wherein the electronically modifying the image comprises adding a first object to the image or removing a second object from the image.

5. The system of claim 1, wherein the operations further comprise generating a random filename for the electronically modified image, wherein the electronically modified image is communicated to the user device with the generated random filename.

6. The system of claim 1, wherein the operations of electronically modifying the original image such that the first checksum of the original image is different from the second checksum of the electronically modified image comprises re-modifying the original image when the second checksum of the electronically modified image is the same as the first checksum of the original image.

7. The system of claim 1, wherein an order in which the set of images is communicated to the user in the authentication process is randomized.

8. A method, comprising:
    receiving an authentication request from a user device;
    retrieving an original image associated with an account of the user device;
    electronically modifying the original image such that a first checksum of the original image is different from a second checksum of the electronically modified image; and
    communicating the electronically modified image to the user device as part of a set of images in an authentication process, wherein an authentication is determined based on a response to the set of images including the electronically modified image received from the user device.

9. The method of claim 8, wherein the electronically modified image is a current electronically modified image, and wherein the current electronically modified image is different from a previous electronically modified image resulting from a previous authentication request from the user device.

10. The method of claim 8, wherein the response from the user device comprises a selection of an image from the set of images as being associated with the image that is retrieved, and wherein the user device is authenticated when the image selected corresponds to the original image that is retrieved.

11. The method of claim 8, wherein the electronically modifying the image comprises adding a first object to the image or removing a second object from the image.

12. The method of claim 8, further comprising generating a random filename for the electronically modified image, wherein the electronically modified image is communicated to the user device with the generated random filename.

13. The method of claim 8, wherein electronically modifying the original image such that the first checksum of the original image is different from the second checksum of the electronically modified image comprises re-modifying the original image when the second checksum of the electronically modified image is the same as the first checksum of the original image.

14. The method of claim 8, wherein an order in which the set of images is communicated to the user in the authentication process is randomized.

15. A non-transitory machine-readable medium having stored thereon machine-readable instructions executable to cause a machine to perform operations comprising:
    receiving an authentication request from a user device;
    retrieving an original image associated with an account of the user device;

electronically modifying the original image such that a first checksum of the original image is different from a second checksum of the electronically modified image; and communicating the electronically modified image to the user device as part of a set of images in an authentication process, wherein an authentication is determined based on a response to the set of images including the electronically modified image received from the user device.

16. The non-transitory machine-readable medium of claim 15, wherein the electronically modified image is a current electronically modified image, and wherein the current electronically modified image is different from a previous electronically modified image resulting from a previous authentication request from the user device.

17. The non-transitory machine-readable medium of claim 15, wherein the response from the user device comprises a selection of an image from the set of images as being associated with the image that is retrieved, and wherein the user device is authenticated when the image selected corresponds to the original image that is retrieved.

18. The non-transitory machine-readable medium of claim 15, wherein the operations of electronically modifying the image comprises adding a first object to the image or removing a second object from the image.

19. The non-transitory machine-readable medium of claim 15, wherein the operations further comprise generating a random filename for the electronically modified image, wherein the electronically modified image is communicated to the user device with the generated random filename.

20. The non-transitory machine-readable medium of claim 15, wherein the operations of electronically modifying the original image such that the first checksum of the original image is different from the second checksum of the electronically modified image comprises re-modifying the original image when the second checksum of the electronically modified image is the same as the first checksum of the original image.

\* \* \* \* \*